United States Patent [19]

Warner

[11] 4,434,986
[45] Mar. 6, 1984

[54] SHAFT SEAL

[75] Inventor: Dale J. Warner, Palos Heights, Ill.

[73] Assignee: Gits Brothers Mfg. Co., Bedford Park, Ill.

[21] Appl. No.: 433,838

[22] Filed: Oct. 12, 1982

[51] Int. Cl.³ .............................................. F16J 15/34
[52] U.S. Cl. ........................................ 277/42; 277/65
[58] Field of Search .................................. 277/38–42, 277/65, 81 R

[56] References Cited

U.S. PATENT DOCUMENTS

| | | | |
|---|---|---|---|
| 2,662,480 | 12/1953 | Cliborn | 277/65 |
| 3,941,395 | 3/1976 | Ball et al. | 277/41 |
| 4,328,973 | 5/1982 | Delbridge | 277/65 |

OTHER PUBLICATIONS

Type 88 Compact, Field Repairable Seal, Crane Packing Company Bulletin, No. S-2032.

*Primary Examiner*—Robert T. Smith
*Attorney, Agent, or Firm*—Hill, Van Santen, Steadman & Simpson

[57] ABSTRACT

A shaft seal has a pair of stationary, yet floating, seals which are biased into engagement with opposite sides of a mating ring carried on a rotating drive sleeve. The mating ring is maintained perpendicular to the axis of rotation and against a squaring surface of the drive sleeve. The location of a secondary seal pressure balances internal machine pressure at the primary seal at a ratio of 80:20, and provides a reverse pressure balance of greater than 100%.

13 Claims, 4 Drawing Figures

SHAFT SEAL

BACKGROUND OF THE INVENTION

1. Field of the Invention

The present invention relates to a shaft seal for a rotatable shaft which extends through an end wall of a machine, and more particularly to a shaft seal for operation under pressure conditions.

2. Description of the Prior Art

Shaft seals of the general type set forth above are well known in the art. For example, the Type 41 manufactured by Gits Bros. Mfg. Co., Bedford Park, Ill. employs a pair of rotary seal assemblies which rotate with a drive sleeve and have seal faces which engage respective stationary members which are fixed to a gland secured to a machine housing. The stationary seal elements are sealed with respect to each other by way of O-rings and the rotary elements, which are stationary with respect to each other, are also sealed by O-rings.

All of the elements are carried basically side-by-side in a telescoped relationship about a drive sleeve and a coolant may be supplied between the elements and the drive sleeve.

SUMMARY OF THE INVENTION

The object of the present invention is to provide a shaft seal of the type generally set forth above in which enhanced cooling of the main seal area is provided and in which the primary seal is pressure balanced at a ratio of 80:20, and which a barrier pressure greater than pump pressure is provided so that the primary seal is balanced at greater than 100% with respect to reverse pressure.

The above objects are achieved, according to the present invention, by providing a pair of primary seals which are fixed against rotation and which are axially movable and biased towards one another within a seal housing (gland). Each of the primary seals has a seal face which mates with a respective seal face provided on opposite sides of a seal member which is rotatable with a drive sleeve. The drive sleeve includes a radially-extending surface and the seal member is held thereagainst so that the seal faces are always perpendicular to the axis of rotation. The primary seals, although fixed against rotation, are somewhat free to float so that the seal faces of the seal member always completely engage the seal faces of the stationary seals. The primary seals are of different diameters so as to set a positive pressure against the main face and help maintain the seal member square on the drive sleeve.

According to a feature of the invention, the inboard (machine side) primary seal has its seal holder constructed as a step which lies opposite an oppositely-directed step in a ledge of the housing. Each of the steps is defined by an annular surface and a radially-extending surface and an O-ring engages each of the surfaces. The annular surface of the largest diameter (outer diameter of the O-ring) is lined up with a line defining 80% of the seal face area of the primary seal so that, of the entire seal face area, 80% lies radially inward of the secondary seal outer diameter. Similarly, the inside diameter of the O-ring is lined up with a line which is radially inside of the seal face area. The secondary seal therefore provides a pressure balance for the primary seal against the seal face in the ratio of 80:20 and, in a reverse pressure situation, provides that the primary seal is balanced at greater than 100%.

According to another feature of the invention, the outboard end of the drive sleeve is constructed as a flange which includes first and second pluralities of threaded bores spaced alternately about the flange. Centering screws are provided for the first bores, the centering screws including a pair of axially-spaced stop surfaces with a cylindrical section therebetween having an outer surface. The centering screws are inserted, but not fully advanced, and the drive sleeve is moved in the inboard direction until the surface of the cylindrical portion engages the outboard end of the housing. This sets the spring bias for the primary seals and the spacing between the primary seals and the spring holders. Next, the centering screws are advanced until one stop engages an annular surface on the housing and the other stop engages the flange of the drive sleeve. This centers the drive sleeve with respect to housing. Set screws are then inserted into the second bores to secure the drive sleeve to the shaft and the centering screws are removed.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
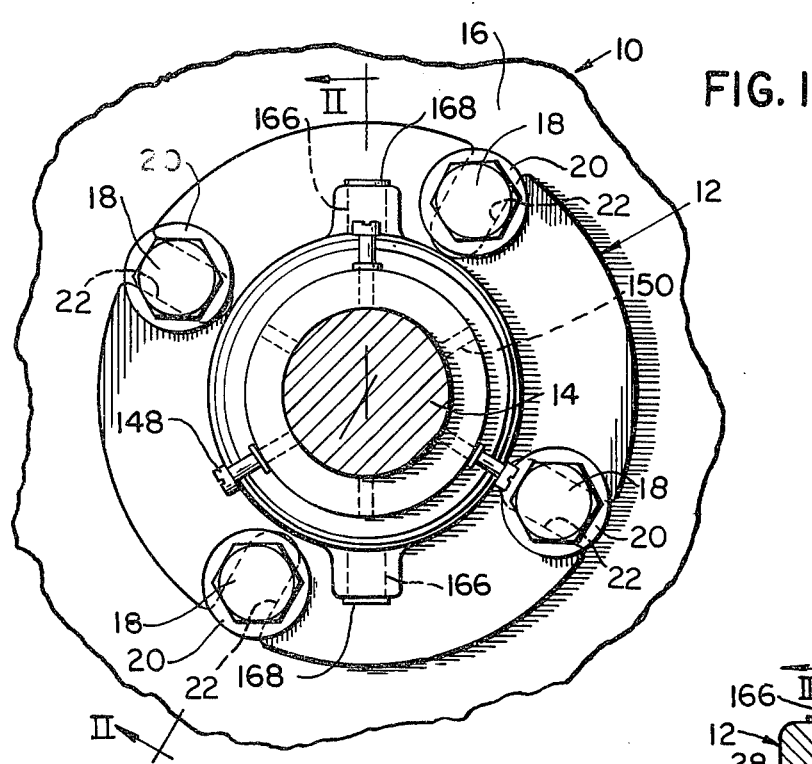
FIG. 1 is a view of the outboard end of a shaft seal constructed in accordance with the present invention.
Figure 2:
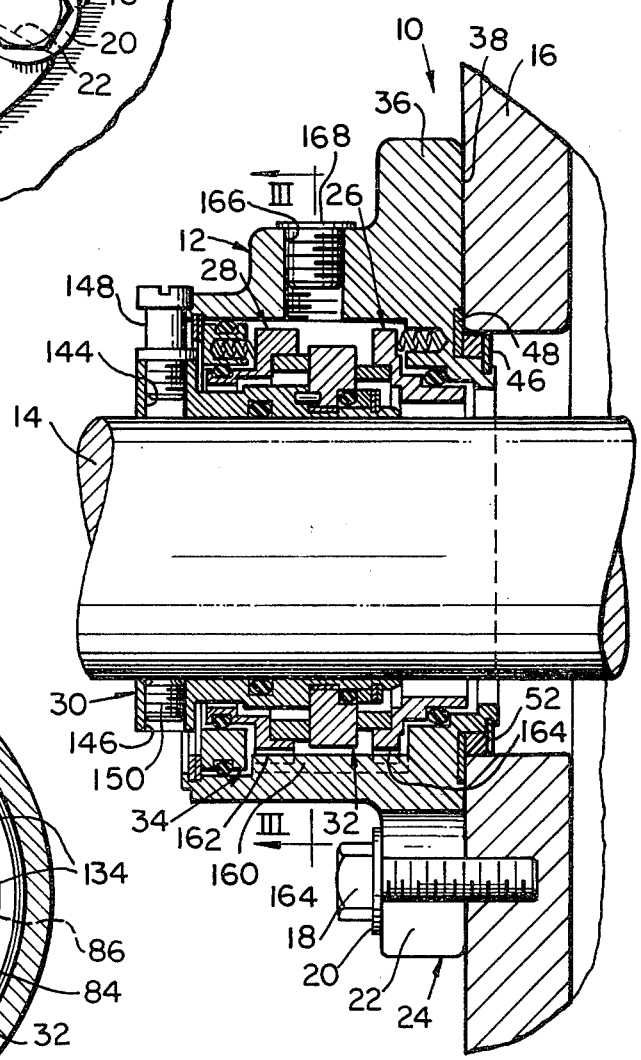
FIG. 2 is a sectional view taken generally along the parting line II—II of FIG. 1.

Referring to FIGS. 1 and 2, a shaft seal mounted on an end wall of a machine, such as a pump, is generally illustrated at 10 as comprising a plurality of major components and assemblies. The shaft seal 12 is mounted on a shaft 14 and is secured to an end wall 16 of a machine by way of a plurality of bolts 18 and washers 20 which extend through the slots 22 in a gland assembly 24. Within the gland assembly 24 is an inboard seal assembly 26, an outboard seal assembly 28, a drive sleeve assembly 30 carrying a mating ring 32 and a back plate assembly 34.

The gland assembly comprises a flange 36 having the slots 22 therein for securing the end face 38 of the shaft seal to a machine. A seal to the machine is effected, as best seen in FIG. 4, by way of a gasket 48, for example asbestos, held in an annular groove 50 by a spacer 46 received about a surface 42 of a projecting portion 40, and a split ring 52 received in an annular groove 44.

Figure 4:
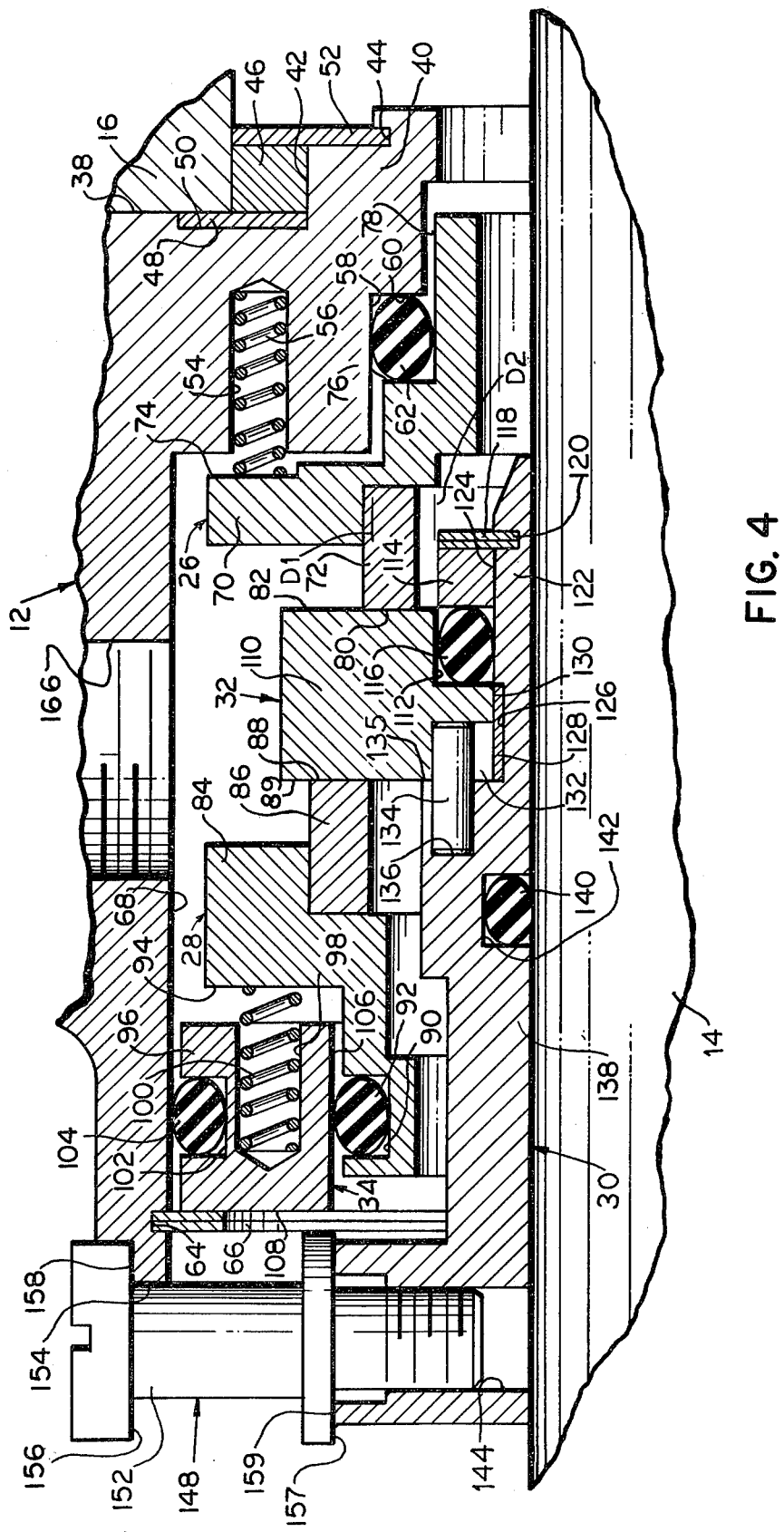
FIG. 4 is an enlarged sectional view of the structure illustrated in the upper portion of FIG. 2.

As also best seen in FIG. 4, the inboard wall of the gland or housing includes a plurality of spaced blind bores 54 each having a spring 56 extending therefrom forming a bias structure for the inboard seal assembly 26. The inboard end of the housing also includes an annular surface 58 and a radially extending surface 60 which engage the outer diameter and the inboard side of an O-ring 62, which will be explained in greater detail below.

At the outboard end of the housing, an annular groove 64 is provided in an inner surface 68 for receiving a snap ring 66 and acting as an outboard stop for the backplate assembly 34.

Referring to FIGS. 2 and 4, the inboard seal assembly 26 comprises a seal holder 70 holding a seal ring 72 against the mating ring 32. The holder 70 includes an inboard facing surface 74 for receiving the springs 56 thereagainst so as to urge the inboard seal assembly 26 towards the outboard direction. The holder 70 further comprises a radially extending surface 76 engaging the outboard side of the O-ring 62 and an annular surface 78 engaging the inner diameter of the O-ring 62. The surface 58 and the outer diameter of the O-ring 62 are aligned with a level D1 which defines 80% of the seal surface 80 which engages the surface 82 of the mating ring 32. Inasmuch as the interior trapped pressure is measured at the outer diameter of the O-ring 62, the primary seal is pressure balanced against the seal face at a ratio of 80:20. The anular surface 78 and the inside diameter of the O-ring 62 are located in alignment with a radial level D2 which falls radially inwardly of the inner diameter of the seal ring 72. Therefore, in the reverse pressure condition where the barrier pressure is greater than the pump pressure, the inner diameter of the secondary seal is positioned so as to provide a balance of greater than 100% against the running face.

In FIGS. 2 and 4, the outboard seal assembly 28 is illustrated as comprising a holder 84 mounting a ring seal 86 having a seal surface 88 bearing against a seal surface 89 of the mating ring 32. Towards the outboard end, the holder 84 is provided with an annular groove 90 having an O-ring 92 therein which bears against and forms a seal with the backplate assembly 34.

The holder 84 also includes a surface 94 which receives a plurality of springs 100 thereagainst, the springs 100 being mounted in and extending from a plurality of blind bores 98 spaced about the ring 96 of the backplate assembly. The outer surface of the ring 96 is provided with an annular groove 102 having an O-ring 104 therein which engages the inner surface 68 of the housing and forms a fluid seal therewith.

As previously mentioned, the snap ring 66 bears against a surface 108 and forms a stop for the backplate assembly.

As is apparent, the primary seals are of different diameters which sets a positive pressure against the main face always maintain the main face against a squaring ledge of the drive sleeve, as will be evident from the following.

The drive sleeve assembly 30 carries the mating ring 32 thereon. The mating ring 32 comprises, as mentioned, faces 82 and 89 for engaging the seal surfaces 80 and 88 of the primary seals. The mating ring body 110 also comprises an annular recess which, together with a washer 114 forms a groove for an O-ring 116 to seal the mating ring to an annular surface 124 of the drive sleeve, the washer 114 being held by a snap ring 118 received in an annular groove 120 in the inboard end 122 of the drive sleeve.

The ring 110 comprises an inner annular surface 130 having a plurality of slots 132 therein for loosely receiving a plurality of drive pins 134 mounted in a plurality of blind bores 136 of a drive sleeve 138. The inner surface of the drive sleeve 138 is provided with an annular groove 142 having an O-ring 140 mounted therein which seals the drive sleeve to the shaft 14.

As shown in FIGS. 1 and 2, the outboard end of the drive sleeve 138 is constructed as a flange having a plurality of first threaded bores 144 alternately spaced with a plurality of second threaded bores 146. As best seen in the left-hand portion of FIG. 4, upon assembly, and prior to fixation to the shaft 14, a plurality of centering screws 148 are inserted in, but not totally advanced, into the threaded bores 144. The drive sleeve assembly is then moved in the inboard direction until a surface 152 of the centering screw 148 abuts an end surface 154 of the housing. This sets the spacing of the internal elements and the spring pressure of the springs 56, 100. The centering screws 148 are then advanced until a first stop 156 engages an annular surface 158 of the housing and a second stop 157 engages the annular surface 159 of the flange. This centers the drive sleeve with respect to the housing. With the centering accomplished, a plurality of set screws 150 are advanced in the bores 146 to secure the drive sleeve to the shaft 14. The centering screws 148 are then removed.

Figure 3:
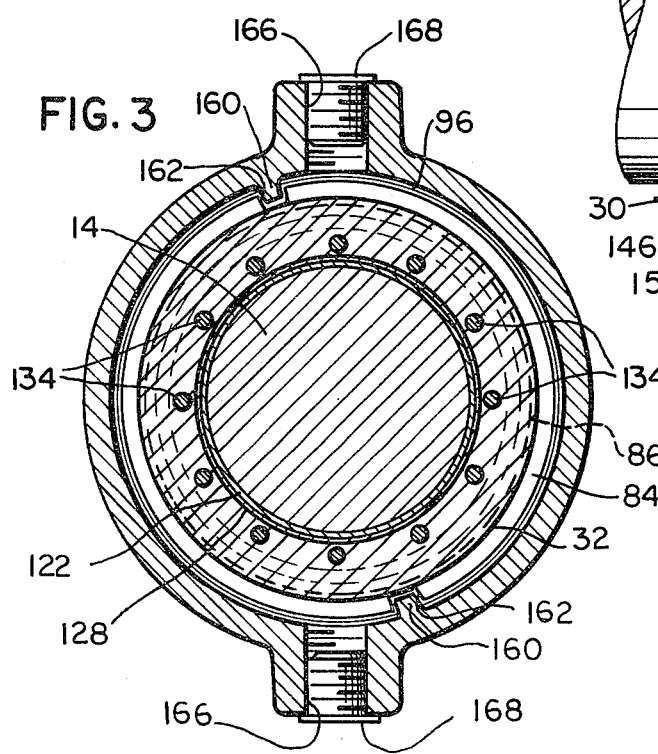
FIG. 3 is a sectional view taken generally along the parting line III—III of FIG. 2.

Referring to FIGS. 2 and 3, the housing is provided with a plurality, here two, keys 160 which are received in a keyway 162 in the seal holder 84 and a keyway 164 in the seal holder 70. It is therefore readily apparent that the primary seals may float in that they are free to move axially and restrained against rotation.

The drive sleeve 138 may also be provided with an annular groove 126 in the area of the inner surface 130 of the ring 110 which mounts a damper 128 to bear against the drive sleeve and the ring.

As mentioned, the ring 110 is maintained perpendicular to the axis of rotation against a radially-extending surface 135 which, in turn, maintains the primary seal interfaces flat and completely engaged.

As shown in all of the figures, and as best detailed in FIG. 4, the housing of the shaft seal may be provided with a pair of threaded bores 166 for connection to lines for supplying and discharging a coolant. Each of the threaded bores 166 may be provided with a protective cap 168 to maintain the seal free of dust and the like prior to connection to the supply and discharge lines. As evident in FIG. 4, the volume about the primary seals is substantial and may handle a quantity of coolant which may directly contact the interfacing seal elements. Therefore, heat is reduced and cooling is enhanced in the main seal area.

Advantageously, te seal rings may be made of carbon, the mating ring of silicon carbide and the drive pins of tungsten carbide, while the gland, holders washers, retaining rings and sleeves may be made of stainless steel. The centering screws may be made of aluminum, the O-rings of Viton and the springs of Hastelloy C material.

Although I have described my invention by reference to a particular illustrative embodiment thereof, many changes and modifications of the invention may become apparent to those skilled in the art without departing from the spirit and scope of the invention, I therefore intend to include within the patent warranted hereon all such changes and modifications as may reasonably and properly be included within the scope of my contribution to the art.

I claim:

1. A shaft seal for a rotatable shaft which extends through a wall of a machine, said shaft seal comprising:
    a hollow housing for receiving the shaft therethrough and adapted for fluid-sealed connection to the machine wall, including an inner surface and a ledge;

a drive sleeve for connection to and receiving the shaft therethrough for rotation therewith in a fluid-sealed relationship within said housing;

a ring-shaped first seal member about and coupled to said drive sleeve for rotation therewith and comprising first and second radially-extending seal faces on axially opposite sides thereof;

first sealing means for receiving the shaft therethrough, said first sealing means being fluid sealed to, axially movable within and fixed against rotation with respect to said housing, said first sealing means comprising a second seal member including a radially-extending third seal face;

first bias means in said housing ledge urging said first sealing means axially towards said ring-shaped seal member to engage said first and third seal faces;

second sealing means receiving said drive sleeve therethrough, said second sealing means being fluid sealed to, axially movable within and fixed against rotation with respect to said housing, said second sealing means comprising a third seal member including a radially extending fourth seal face; and second bias means connected to said housing and fluid sealed to said housing and to said second seal means, said second bias means urging said second seal means axially towards said ring-shaped first seal member to engage said second and fourth seal faces, said first sealing means comprising a first radially-extending surface, a second radially-extending surface, and an annular surface and an O-ring bearing against said second radially-extending surface and said annular surface, and said housing ledge comprising an annular surface bearing against said O-ring and a radially-extending surface bearing against said O-ring and sealing said first sealing means to said housing.

2. The shaft seal of claim 1, and further comprising: first and second ports in said housing for connection to respective coolant supply and discharge lines.

3. The shaft seal of claim 1, wherein:
said first and second sealing means each include at least one keyway; and
said housing includes at least one key extending from said inner surface to be slidably received in said keyways.

4. The shaft seal of claim 1, wherein:
said housing ledge comprises a plurality of spaced blind bores, a plurality of springs in said bores bearing against said first radially-extending surface of said first sealing means to constitute said first bias means.

5. The shaft seal of claim 4, wherein:
said third seal face of said second seal member comprises a predetermined radial dimension; and
said annular surface of said ledge is radially located radially outward at 80% of said predetermined radial dimension.

6. The shaft seal of claim 4, wherein:
said third seal face of said second seal member comprises a predetermined radial dimension limited by inner and outer annular surfaces; and
said annular surface of said first sealing means is located axially displaced from and radially inward of said inner annular surface of said second seal member.

7. The shaft seal of claim 4, wherein:
said second seal member comprises a ring including inner and outer annular surfaces limiting said third seal face;
said annular surface of said first sealing means which bears against said O-ring located axially displaced from and radially inward of said inner annular surface of said ring; and
said annular surface of said ledge which bears against said O-ring being located at the radius equal to 80% of the radial distance from said inner surface of said outer surface of said ring.

8. The shaft seal of claim 1, wherein:
said second bias means comprises a ring-shaped member including an inner surface, an outer surface, an annular groove in said outer surface, an O-ring in said groove bearing against said inner surface of said housing, a plurality of spaced blind bores, and a plurality of springs in said bores bearing against said second sealing means; and
said second sealing means comprises a radially-extending surface receiving said springs thereagainst, an annular surface extending into said ring-shaped member of said second bias means, an annular groove in said annular surface, and an O-ring in said groove bearing against said inner surface of said ring-shaped member.

9. The shaft seal of claim 1, wherein:
said drive sleeve comprises a tubular member including an inner surface defining a bore for receiving the shaft therethrough, an annular surface and a radially-extending surface, a plurality of blind bores in said radially-extending surface, a plurality of drive pins seated in and extending from said bores, an annular groove in said inner surface, and an O-ring in said groove to bear on the shaft, and holding means for holding said first seal member on said annular surface and against said radially-extending surface; and said first seal member comprises an inner surface mounted on said annular surface of said drive sleeve, a plurality of slots extending into said second radially extending seal surface of receiving said drive pins being of greater radial dimension than said drive pins, an annular recess in said inner surface and said first seal face, and an O-ring in said recess held by said holding means and bearing on said annular surface of said drive sleeve, said holding means holding said second seal face against said radially-extending face such that said first and second seal faces are always urged towards the perpendicular with respect to the axis of rotation.

10. The shaft seal of claim 9, wherein:
said drive sleeve further comprises an annular groove in said annular surface, and a damper in said groove bearing against said inner surface of said first seal member.

11. The shaft seal of claim 1, wherein:
said drive sleeve, said first seal member, and said first and second sealing means are mounted generally coaxially within said housing;
said housing includes an end having a peripheral recess therein defining an annular surface;
said drive sleeve comprises a flange including a plurality of radially-extending spaced first threaded bores and a plurality of radially-extending spaced second threaded bores therein and a stop surface at a predetermined radius; and further comprising a plurality of centering screws each including a threaded portion received in a respective first threaded bore, a first flange and a second flange, each of said centering screws advanced until said first flange engages said stop surface; and a plurality of set screws each received in a respective second threaded bore to secure said drive sleeve to the shaft after centering by said centering screws, said centering screws to be removed after securement of said drive sleeve to said shaft by said set screws.

12. The shaft seal of claim 1, wherein:

said first and second sealing means, said drive sleeve, said first seal member, and said first and second bias means are all mounted coaxial within said housing and, said drive sleeve, said first seal member and said first and second sealing means are axially movable with respect to said first and second bias means;

said drive sleeve comprises an end including a plurality of first and second radially-extending peripherally spaced threaded bores and a plurality of first and second screws in said bores, each of said first screws including an outer surface; and said housing includes an end to be engaged by said outer surfaces of said first screws upon movement of said drive sleeve into said housing to set predetermined spacings and spring forces between said first bias means and said first sealing means and between said second bias means and said second sealing means, said second screws to be advanced to secure said drive sleeve to the shaft after setting of said predetermined spacings and said first screws thereafter to be removed to disengage said drive sleeve from said housing.

13. A shaft seal for a rotatable shaft which extends through an end wall of a machine, comprising:

a hollow housing including an open end, a ledge at the opposite end with an opening for receiving the shaft therethrough, an inner annular wall, first bores in said ledge, first bias means including first springs in and extending from said bores, a recess in said ledge, and a first O-ring in said recess;

second bias means mounted at said open end and including an annular surface defining an opening for receiving the shaft therethrough, second bores, and second springs in and extending from said second bores;

a drive sleeve for receiving the shaft therethrough comprising means for connecting said drive sleeve to said shaft for rotation therewith, drive pins extending axially from said sleeve, an annular internal groove and a second O-ring in said groove sealing said drive sleeve to the shaft;

a ring-shaped seal member carried on said drive sleeve including a pair of radially-extending seal faces, slots for loosely receiving said drive pins so that said ring-shaped seal member rotates with said drive sleeve, an annular recess and a third O-ring in said annular recess sealing said ring-shaped seal member to said drive sleeve;

holding means on said drive sleeve holding said ring-shaped seal member so that said seal faces are perpendicular to the axis of rotation;

first and second sealing means mounted against rotation in said housing and each including a seal face for engaging a respective seal face of said ring-shaped seal member;

said first sealing means including a recess facing said recess of said ledge and also receiving said first O-ring therein to seal said first sealing means to said housing;

said second sealing means comprising an annular groove and a fourth O-ring in said groove bearing against said annular surface of said second bias means and selaing said second sealing means to said second bias means; and said first and second springs respectively bearing against and urging said first and second sealing means towards said ring-shaped seal member to engage said seal faces thereof with respective seal faces of said ring-shaped seal member.

* * * * *